Oct. 10, 1950  C. LYNN  2,525,495
EXCITATION SYSTEM
Filed April 29, 1949
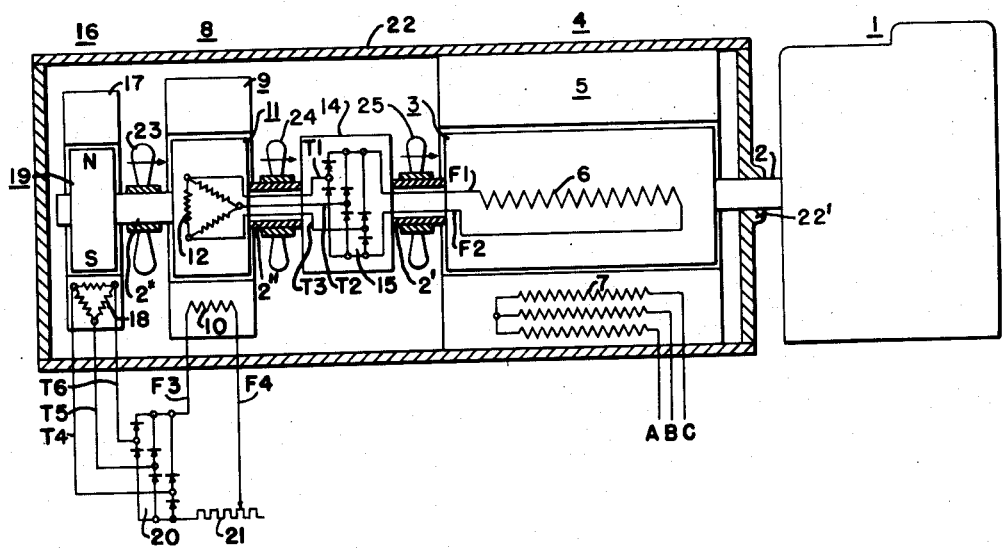
WITNESSES:
INVENTOR
Clarence Lynn.
BY
ATTORNEY Patented Oct. 10, 1950

2,525,495

UNITED STATES PATENT OFFICE 2,525,495

EXCITATION SYSTEM

Clarence Lynn, Pittsburgh, Pa., assignor to Westinghouse Electric Corporation, East Pittsburgh, Pa., a corporation of Pennsylvania Application April 29, 1949, Serial No. 90,511

2 Claims. (Cl. 322—59)

My invention relates to means and methods for securing an improved excitation-system for a turbo-generator.

Improvements in central-station equipment, particularly boilers and their auxiliaries, have made it possible to operate turbine-generator units continuously for long periods of time, such as one to two years, or even longer. Brushes on the commutator of the exciter, and on the collector-rings of the generator, do not last that long, and no one has been able to develop a brush that will last that long. In the face of this situation, brush holders have been developed which will permit the changing of the brushes while the machines are in operation, without requiring the use of any tools around the machines, and with little possibility of danger to persons or machines, but these special brush holders can only be used on commutators and slip-rings which are accessible in air. Most central-station operators desire to use hydrogen-cooling for the turbo-generators, and also desire to have shift-driven exciters, so that excitation will be available as long as steam is turning the shaft, provided that the exciter is workable. In the case of trouble on the exciter, it may be necessary to shut down the entire turbo-generator unit, which, of course, is undesirable.

My present invention has, for its object, the provision of a turbo-generator unit, having shaft-mounted exciters, using an alternating-current main-exciter having its armature-winding on the rotor-member, and connected directly to the rotating field of the generator, through a rotating rectifier-unit, so that no brushes are needed, either for a commutator or for a slip-ring. Selenium-oxide rectifiers are available, which are sufficiently small in size, and sufficiently rugged in operation, to make my invention entirely practicable, with promise of being able to remain continuously in service for a longer period of time than the steam-driven main generator.

With the foregoing and other more specific objects in view, my invention consists of the circuits, systems, combinations, parts and methods of design and operation which are hereinafter described and claimed, and illustrated in the accompanying drawing, the single figure of which is a very diagrammatic illustration of the essential components of an illustrative form of embodiment of my invention.

In the illustrated form of embodiment of the invention, a steam turbine 1 turns a shaft 2 which carries the rotor-member 3 of a polyphase turbo-generator 4. In addition to the rotor-member 3, the generator 4 is also provided with a stator-member 5. As diagrammatically indicated on the drawing, the rotor-member 3 of the generator carries a field-winding 6 having terminals F1 and F2; while the stator-member 5 carries a three-phase armature-winding 7 which is adapted to be connected to a three-phase line ABC.

In accordance with my invention, I also provide an alternating-current main-exciter 8, which has a stator-member 9 carrying a field-winding 10, and a rotor-member 11 carrying a three-phase armature-winding 12. The field-winding 10 of the main-exciter has terminals F3 and F4, while the rotating armature-winding 12 has terminals T1, T2 and T3.

In accordance with my invention, I also provide an intermediately disposed rotating member 14, which is diagrammatically indicated after the manner of a block-diagram. This intermediately disposed rotating member 14 carries a selenium-oxide rectifier-assembly 15, which may be regarded as being typical of any suitable rectifier-assembly having no parts which move relatively to each other, and which have a suitably long life, and the requisite current-carrying ability with a volumetric space-requirement which is not too great for practical mounting as a rotor-member on an extension 2', 2'' of the turbine-shaft 2. The shaft-portion 2'' is hollow, so that the output-leads T1, T2 and T3 of the main-exciter 8 may be passed through said shaft 2'', so as to constitute the input-leads of the rectifier-assembly 15. In like manner, the shaft-portion 2' is hollow, so that the field-leads F1 and F2 of the turbine generator 4 may pass through said hollow shaft 2'' so as to serve as the output-terminals of the rectifier-assembly 15.

Any suitable means may be used for providing the direct-current energization for the field-terminals F3 and F4 of the main-exciter 8. In the usual case, it is desirable that the main-exciter field-terminals F3 and F4 shall be excited from a shaft-driven pilot-exciter. In accordance with my present invention, therefore, I have provided a brushless shaft-driven pilot-exciter 16, having a stator-member 17 carrying a three-phase armature-winding 18, and a permanent-magnet rotor-member 19 which is mounted on a shaft-extension 2* of the turbine-shaft 2, 2', 2''. It will thus be seen that this turbine-shaft serves as a common shaft carrying the rotor-member 3 of the generator 4, the rotating rectifier-assembly 14, the rotor-member 11 of the main-exciter 8, and the rotor-member 19 of the pilot-exciter 16, in the order named.

The three-phase armature-winding 18 of the pilot-exciter 16 has three terminals T4, T5 and T6 which are connected to the field-terminals F3 and F4 of the main-exciter 8, through a stationary rectifier-assembly 20, which may be similar to the rectifier-assembly 15, except that it is smaller in capacity. A field-rheostat 21, or other field-regulating means, is normally included in the field-winding connections of the main-exciter 8, as will be readily understood.

Most modern turbine-generators are hydrogen-cooled, in order to secure the benefits of the lower windage-losses which operate as a constant charge against the operation of the generator. To this end, I have diagrammatically indicated my generator-unit as being enclosed in a housing 22, which is preferably gas-tight, and which is preferably filled with hydrogen, said housing being provided with a suitable gland-seal 22' at the point where the generator-shaft 2 extends through the housing so as to extend to the steam turbine 1. Since my excitation-equipment is entirely brushless, and is capable of operating for long periods of time, it is feasible, and hence usually preferable, although not obligatory, to include some or all of my excitation-equipment in the gas-tight housing 22, which thus surrounds the generator 4, the rotating rectifier-assembly 14, the main-exciter 8, and the pilot-exciter 16, or as many of these members as may be desired. The stationary rectifier-assembly 20 and the field-rheostat 21 may, or may not, be located within the housing 22: they are illustrated as being outside of the housing 22.

As in other totally enclosed machines, it is customary to suitably ventilate the enclosed apparatus. By way of diagrammatically indicating the presence of such ventilation, I have shown three fans 23, 24 and 25, mounted on the shaft-portions 2*, 2'', and 2', respectively, for providing a cooling gas-movement within the housing 22, for cooling the exciters 16 and 8, the rotating rectifier-assembly 14, and the main-generator 4. It is particularly necessary to ventilate the rotating rectifier-assembly 14, in order to reduce the requisite size of this equipment, as without such ventilation said assembly would be rather awkwardly large for mounting on a high-speed turbine-shaft.

In the operation of my invention, it will be noted that I have provided an excitation-system which uses no current-collecting brushes whatsoever. The permanent-magnet field member 19 of the pilot-generator 16 requires no excitation-winding and no excitation-current. The polyphase output of this pilot-generator is rectified, without any moving parts, in the stationary rectifier-assembly 20 which preferably consists of selenium-oxide rectifiers, the output of which supplies direct-current energy to the stationary field-winding 13 of the main-exciter 8. The output of the main-exciter 8 is polyphase energy, which is delivered, without any slip-rings or brushes, directly to the rotating rectifier-assembly 14, which converts this power to direct-current energy, without any relatively moving parts, and delivers the same, without requiring any slip-rings or brushes, to the rotating field-winding 6 of the main generator 4.

It will be understood that my illustration of my invention is quite diagrammatic, no effort being made to show the bearings or shaft-couplings, or stand-by collector-ring excitation-means (if desirable) for use in the event of failure of the main-exciter 8 or the selenium-oxide rectifier 15, or other general details which will be well understood. In general, I wish it to be understood that there are many details in which my invention may be changed, by way of additions, omissions, and the substitution of equivalents, without departing from the essential object of the invention. I desire, therefore, that the appended claims shall be accorded the broadest construction consistent with their language.

I claim as my invention:

1. An electrical generator-unit, comprising an alternating-current generator having a stator-member carrying an alternating-current armature-winding and a rotor-member carrying a field-winding, an alternating-current main-exciter having a stator-member carrying a field-winding and a rotor-member carrying an alternating-current armature-winding, a rotating member carrying a rectifier-assembly having no parts which move relatively to each other, an alternating-current pilot-exciter having a stator-member carrying an alternating-current armature-winding and a permanent-magnet rotor-member, means for in effect providing a common shaft carrying the rotor-member of the generator, the rotating rectifier-assembly, the rotor-member of the main-exciter, and the rotor-member of the pilot-exciter, electrical connections, carried by said shaft, for connecting the rotating rectifier-assembly between the armature-winding of the main-exciter and the field-winding of the generator, a stationary rectifier-assembly having no parts which move relatively to each other, and electrical connections for connecting the stationary rectifier-assembly between the armature-winding of the pilot-exciter and the field-winding of the main-exciter.

2. The invention as defined in claim 1, including a housing surrounding at least said generator, rotating rectifier-assembly, main-exciter, and pilot-exciter, and means for providing cooling gas-movement within said housing for cooling at least said generator, rotating rectifier-assembly, and main-exciter.

CLARENCE LYNN.

REFERENCES CITED

The following references are of record in the file of this patent:

UNITED STATES PATENTS

| Number | Name | Date |
|---|---|---|
| 2,414,287 | Crever | Jan. 14, 1947 |